US011459997B2

(12) United States Patent
Parsa et al.

(10) Patent No.: US 11,459,997 B2
(45) Date of Patent: Oct. 4, 2022

(54) WAVE ENERGY CONVERTER INCLUDING A DUAL-POINT ABSORBER CONNECTED TO AN ABOVE-WATER INSTALLATION VIA A LINKAGE

(71) Applicant: Ocean Power Technologies, Inc., Monroe Township, NJ (US)

(72) Inventors: Kourosh Parsa, Monroe Township, NJ (US); Neil Williams, Monroe Township, NJ (US)

(73) Assignee: Ocean Power Technologies, Inc., Monroe Township, NJ (US)

( * ) Notice: Subject to any disclaimer, the term of this patent is extended or adjusted under 35 U.S.C. 154(b) by 13 days.

(21) Appl. No.: 17/200,173

(22) Filed: Mar. 12, 2021

(65) Prior Publication Data
US 2021/0301777 A1      Sep. 30, 2021

Related U.S. Application Data

(60) Provisional application No. 63/000,269, filed on Mar. 26, 2020.

(51) Int. Cl.
*F03B 13/16* (2006.01)
*F03B 13/20* (2006.01)
(Continued)

(52) U.S. Cl.
CPC .............. *F03B 13/20* (2013.01); *B63B 22/04* (2013.01); *H02K 7/1853* (2013.01); *B63B 2035/4466* (2013.01)

(58) Field of Classification Search
CPC ....... F03B 13/20; H02K 7/1853; B63B 35/44; B63B 22/04; B63B 2035/4466
(Continued)

(56) References Cited

U.S. PATENT DOCUMENTS 8,723,355 B2 *  5/2014  Eder ................. F03B 13/16
                                             307/9.1
9,091,246 B2 *  7/2015  Hassavari ............ B63B 35/44
(Continued)

FOREIGN PATENT DOCUMENTS

WO    2014113899 A1    7/2014
WO    2016064890 A1    4/2016
WO    2019217475 A1    11/2019

OTHER PUBLICATIONS

Ruiyin Song, Meiqin Zhang, Xiaohua Qian, Xiancheng Wang, Yong Ming Dai and Junhua Chen; A Floating Ocean Energy Conversion Device and Numerical Study on Buoy Shape and Performance; Journal of Maritime Science and Engineering; May 10, 2016; 14 pages, 2016; vol. 4-35.

(Continued)

*Primary Examiner* — Tulsidas C Patel
*Assistant Examiner* — S. Mikailoff
(74) *Attorney, Agent, or Firm* — Jonathan Pierce; Pierre Campanac; Porter Hedges LLP (57) ABSTRACT

A dual-point absorber includes a first buoy, a second buoy, and a power take-off. The first buoy of the dual-point absorber is connected to a linkage. The second buoy of the dual-point absorber is capable of a movement relative to the first buoy. The power take-off is coupled to the first buoy and the second buoy. The linkage can be used to reduce a heave movement of the first buoy that is caused by waves.

17 Claims, 6 Drawing Sheets

(51) Int. Cl.
  *B63B 22/04* (2006.01)
  *H02K 7/18* (2006.01)
  *B63B 35/44* (2006.01)
(58) Field of Classification Search
  USPC .................................................. 290/42, 53
  See application file for complete search history.

(56) References Cited

U.S. PATENT DOCUMENTS

| | | | |
|---|---|---|---|
| 9,581,128 B2* | 2/2017 | MacDonald | F03B 13/16 |
| 2012/0248865 A1* | 10/2012 | Eder | F03B 13/16 |
| | | | 307/9.1 |
| 2012/0261923 A1* | 10/2012 | Hassavari | F03B 13/1845 |
| | | | 290/53 |
| 2015/0152836 A1 | 6/2015 | Stansby | |
| 2015/0275846 A1* | 10/2015 | MacDonald | F03B 13/1855 |
| | | | 290/53 |

OTHER PUBLICATIONS

Cyndia A. Cao; Exploration of Configurations of Wave Energy Converters to Mechanically Drive a Seawater Uranium Harvester; Submitted to the Department of Mechanical Engineering in partial fulfillment of the requirements for the degree of Bachelor of Science in Mechanical Engineering at the Massachusetts Institute of Technology; Jul. 25, 2017; 99 pages.

Alberto Albert, Giovanni Berselli, Luca Bruzzone, Pietro Fanghella; Mechanical design and simulation of an onshore four-bar wave energy converter; Renewable Energy; Dec. 2017; pp. 766-774; vol. 114-Part B (abstract only), Note: Abstract Only.

European Search report of corresponding application No. 21-162990.2 dated Jun. 24, 2021, 8 pages.

Orcaflex, "Vessel theory: Stiffness, added mass and damping," Web page https://www.orcina.com/webhelp/OrcaFlex/Content/html/Vesseltheory,Stiffness,addedmassanddamping.html, 4 pages, retrieved on Jun. 6, 2022.

Encyclopedia Britannica, "differential gear," Web page https://www.britannica.com/technology/differential-gear, 3 pages, retrieved on Jul. 12, 2022.

Wikipedia, "Differential (mechanical device)," Web page https://en.wikipedia.org/wiki/Differential_(mechanical_device), 8 pages, retrieved on Jul. 12, 2022.

Montasir O. Ahmed et al., "Effects of water depth, mooring line diameter and hydrodynamic coefficients on the behaviour of deep-water FPSOs," Ain Shams Engineering Journal, 14 pages, Dec. 2019.

* cited by examiner

WAVE ENERGY CONVERTER INCLUDING A DUAL-POINT ABSORBER CONNECTED TO AN ABOVE-WATER INSTALLATION VIA A LINKAGE

CROSS-REFERENCE TO RELATED APPLICATIONS

This application claims priority to U.S. provisional application Ser. No. 63/000,269 filed on Mar. 26, 2020.

BACKGROUND

This disclosure relates generally to methods and apparatus for converting wave energy into electric energy. This disclosure relates more particularly to platform-connected dual-point absorbers.

A dual-point absorber is a type of wave energy converter (WEC) that generates power from the waves in a body of water based on the relative displacement between its two floating bodies. In one such system, the two floating bodies are known as the float-and-spar absorber. So far, the spar has been moored to the seabed, using either a single- or three-leg mooring system. Spar moorings, especially 3-leg ones, can be costly in terms of both components and installation/removal operations; have large footprints on the seabed, wide watch circles at the surface, or both; and are difficult to assemble into an array. Moreover, in case the power generated by the float-and-spar absorber is to be used on an above-water installation (e.g., a platform), an umbilical cable would have to be run from the spar down to the seabed and then up the water column to the above-water installation, which can be expensive.

Another possible issue may be that the power-generation response of the float-and-spar absorber is wave-period dependent, which means that it has its best performance at a mid-range of periods, hereinafter referred to as the design period range or simply the design range. At periods outside that range, the response of the two bodies is either generally small, for shorter periods, or in phase, for larger periods, which means that the float-and-spar absorber can only harvest a small portion of the waves hydrokinetic energy outside the design range. Indeed, in the float-and-spar absorber, the spar is not restrained in heave; therefore, a portion of the wave energy is stored in the spar in the form of kinetic energy and then damped in the form of viscous damping and drag without generating electricity.

Thus, there is a continuing need in the art for methods and apparatus for converting wave energy into electric energy that involve a dual-point absorber connectable to an above-water installation. Preferably, these methods and apparatus increase the power generated relative to a dual-point absorber moored to the seabed, in particular outside of the design period range. Preferably again, these methods and apparatus facilitate the connection of several dual-point absorbers to the above-water installation.

SUMMARY

The disclosure describes a wave energy converter.

The wave energy converter may comprise a dual-point absorber that may include a first buoy, a second buoy, and a power take-off. The first buoy may have a lower hydrostatic stiffness with respect to heave than the second buoy. The first buoy may be heavier than the second buoy. The second buoy may be capable of a movement relative to the first buoy. The power take-off may be coupled to the first buoy and the second buoy. The power take-off may be configured to transmit the movement of the second buoy relative to the first buoy to an electric generator. In some embodiments, the dual-point absorber may not include an energy storage coupled to the generator.

The wave energy converter may comprise a linkage that may be connected to the first buoy of the dual-point absorber. The linkage may be capable of being further connected to an above-water installation. The linkage may be configured to reduce, in use, a heave movement of the first buoy that is caused by waves. In some embodiments, the linkage may be capable of moving relative to the above-water installation. For example, the linkage may include a first bar hinged on the first buoy and a second bar hinged on the first buoy. In some embodiments, the linkage may be configured to be fixed relative to the above-water installation.

In some embodiments, the wave energy converter may further comprise an energy storage system capable of being mounted to the above-water installation and an umbilical cable configured to be connected to the generator and to the energy storage system. The umbilical cable may not be coupled to a seabed anchor.

In some embodiments, the wave energy converter may further comprise another power take-off that may be coupled to the linkage. The other power take-off may be coupled to the first bar of the linkage. In some embodiments, the wave energy converter may comprise a further power take-off that may be distinct from the other power take-off. The further power take-off may be coupled to the second bar.

In some embodiments, the wave energy converter may further comprise a controller coupled to the other power take-off. The controller may be programmed to monitor the sea state and to cause a slowing-down or a blockage of movement of the linkage based on the monitored sea state. The controller may receive signals indicative of movement of the first buoy, movement of the second buoy relative to the first buoy, or movement of the second buoy. Optionally, the controller may receive signals indicative of the movement of a third buoy.

In some embodiments, the wave energy converter may comprise two shafts. Each of the two shafts may be coupled to one of the linkage bars at the above-water-installation connection point. Input shafts of a differential gear may be coupled (e.g., integral with) to the two shafts. An output shaft of the differential gear may be coupled to another electric generator.

In some embodiments, the wave energy converter may comprise two pumps. Each of the two pumps may be coupled to the linkage. The flow generated by the two hydraulic pumps may be combined to drive a single hydraulic motor. The single hydraulic motor may be coupled to another electric generator.

The disclosure describes a method of converting wave energy into electric energy.

The method may comprise the step of providing a dual-point absorber that may include a first buoy, a second buoy, and a power take-off. The first buoy of the dual-point absorber may be connected to a linkage. The second buoy of the dual-point absorber may be capable of a movement relative to the first buoy. The first buoy may have a lower hydrostatic stiffness with respect to heave than the second buoy. The first buoy may be heavier than the second buoy. The power take-off may be coupled to the first buoy and the second buoy. The power take-off may be configured to transmit the movement of the second buoy relative to the first buoy to an electric generator.

The method may comprise the step of connecting the linkage to an above-water installation.

The method may comprise the step of reducing heave movements of the first buoy that is caused by waves via the linkage.

The method may comprise the step of producing electric energy via the generator.

The method may comprise the step of providing an energy storage system on the above-water installation.

The method may comprise the step of connecting an umbilical cable to the electric generator and to the energy storage system. The umbilical cable may not be coupled to a seabed anchor.

The method may comprise the step of providing another power take-off. The other power take-off may be coupled to the linkage.

The method may comprise the step of providing a controller. The controller may be coupled to the other power take-off.

The method may comprise the step of using the controller to monitor sea state.

The method may comprise the step of using the controller to cause a slowing-down or a blockage of movement of the linkage based on the monitored sea state.

The method may comprise the step of providing two power take-offs. Each of the two power take-offs may be coupled to the linkage and another generator. The two power take-offs may be coupled to the other generator such that each of the two power take-offs applies a torque to the other generator.

The method may comprise the step of producing electric energy via the other generator.

BRIEF DESCRIPTION OF THE DRAWINGS

For a more detailed description of the embodiments of the disclosure, reference will now be made to the accompanying drawings, wherein.

DETAILED DESCRIPTION

The disclosure describes a linkage for connecting a dual-point absorber to an above-water installation. The linkage is configured to reduce, minimize, or even prevent the heave motion of one of the buoys of the dual-point absorber. Although the float-and-spar absorber is illustrated in the drawings, the disclosure contemplates other types of dual-point absorber-type for converting wave energy into electric energy.

Figure 1:
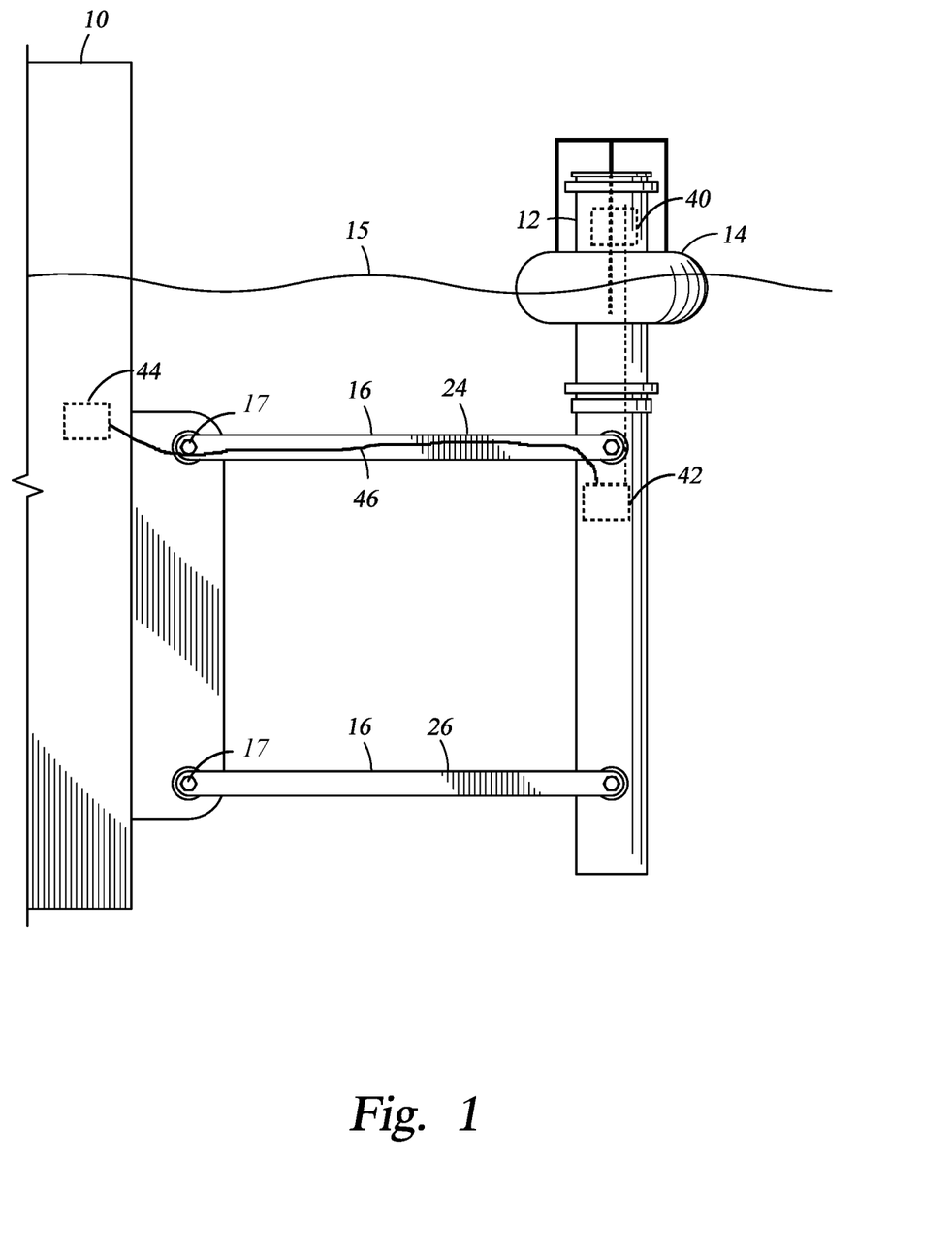
FIG. 1 is a float-and-spar absorber connected to an above-water installation using a four-bar linkage.

FIG. 1 shows an above-water installation 10 and a dual-point absorber. The dual-point absorber includes two buoys floating at sea level 15, a spar 12 and a float 14, and a PTO 40, which is called an internal PTO (i.e., internal to the dual-point absorber formed solely by the spar 12 and the float 14). The float 14 is capable of a movement relative to the spar 12. The internal PTO is coupled to the spar 12 and the float 14 and is configured to transmit the relative movement to an electric generator 42. Usually, the spar 12 has a lower hydrostatic stiffness with respect to heave while it is heavier than the float 14. For example, the spar 12 may have a smaller water-plane area but a larger volume than the float 14. A linkage 16 connects the spar 12 to the above-water installation 10. The linkage 16 is configured to reduce a heave movement of the first buoy (i.e., the spar 12) that is caused by waves.

The spar 12 can be connected to the above-water installation 10 through linkage 16, such as a four-bar linkage, with the spar 12 being the coupler of the four-bar linkage, as shown in FIG. 1. As such, it is possible to restrict the movements of the spar 12 so as to create a phase lag between the responses of the float 14 and the spar 12 to the waves, thus increasing the amount of power generated under waves with periods outside the design period range. The motion restriction can be implemented in many different ways, such as locking one or more of the joints or including a rotational damping element to one or more of the joints. Moreover, the linkage 16 may enable the system to maintain its nominal draft by adjusting to tide changes and storm surges as necessary.

The crank and the rocker of the four-bar linkage are illustrated as simple bars (e.g., including the first bar 24 and the second bar 26) having ends coupled to the above-water installation 10 and the spar 12 via hinge joints in FIG. 1, each hinge joint including a shaft 17. However, the crank and the rocker can be implemented with other mechanical structures, so that the loads applied on the spar 12 can be transferred to the above-water installation 10, as appropriate. For example, the linkage 16 may include a structure that resembles an open-ended wrench that embraces at least a portion of the length of the spar 12 at one end. The structure may include a hinge joint at the other end to be movable relative to the above-water installation 10. Alternatively, the linkage 16 may be fixed relative to the above-water installation 10.

The above-mentioned four-bar linkage can be designed to be a parallelogram to keep the body of the spar 12 parallel to the above-water installation 10, which may be desirable in many applications.

Figure 2:
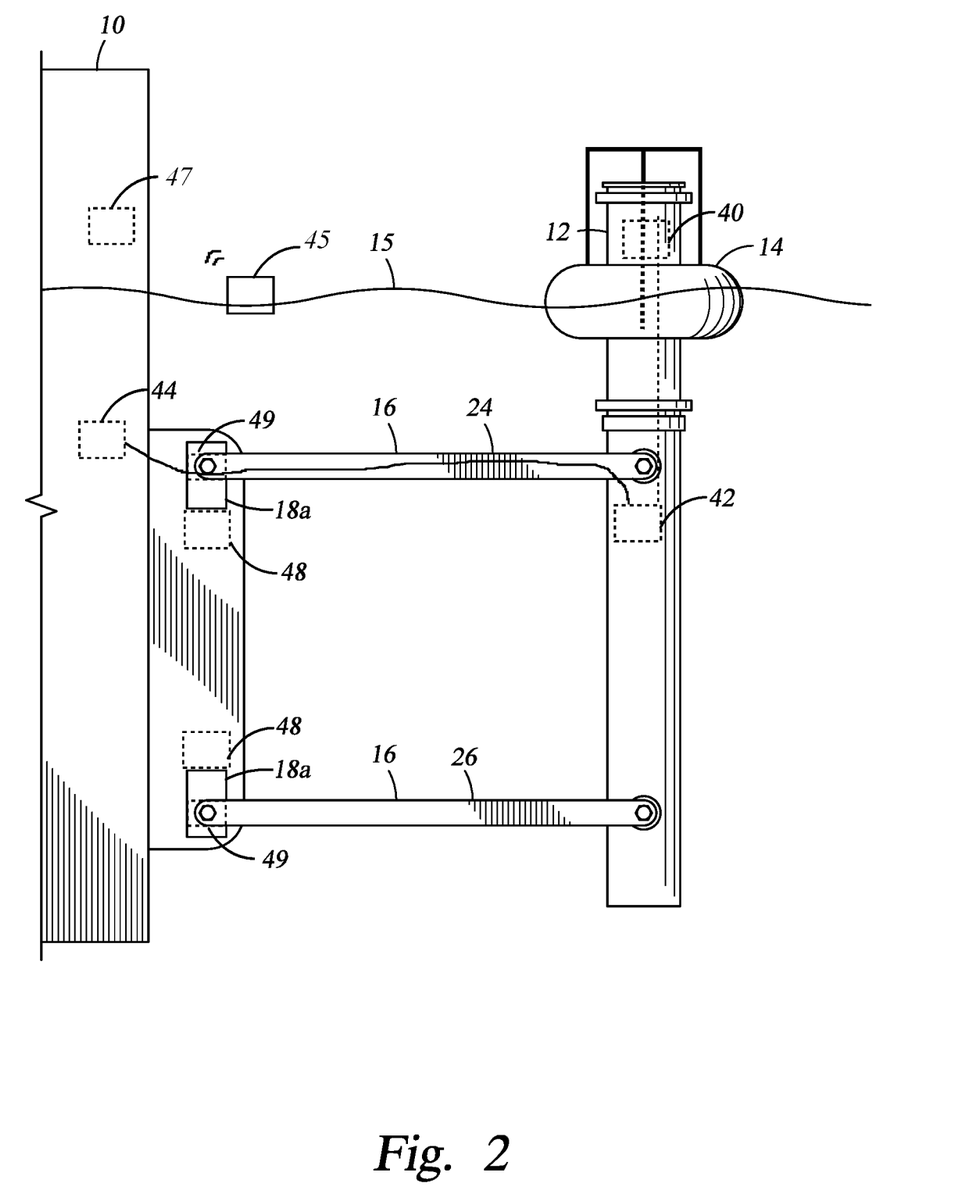
FIG. 2 is a float-and-spar absorber connected to an above-water installation using a four-bar linkage having hinge joints, wherein the shafts of the hinge joints are connected to a power take-off (PTO) system.
Figure 2A:
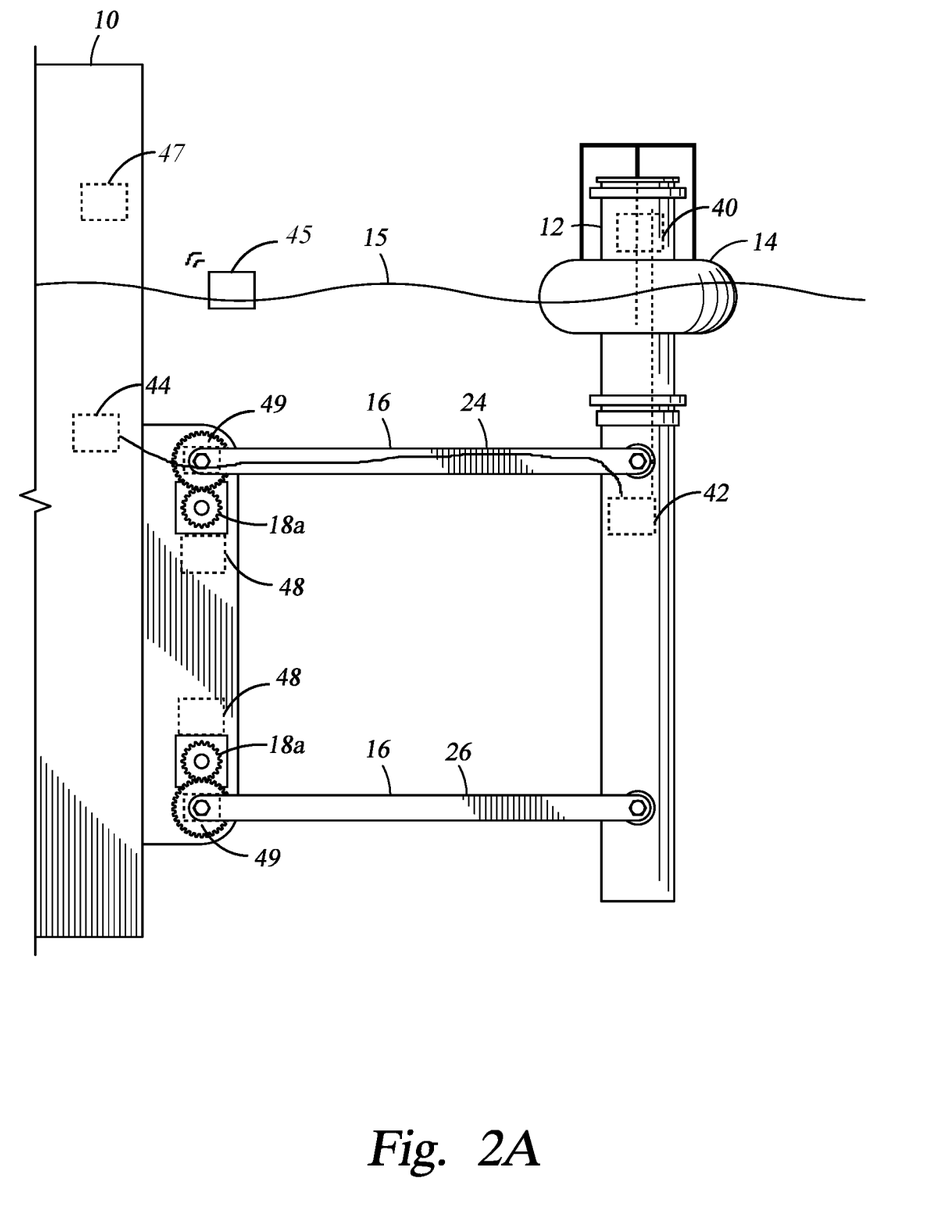
FIG. 2A is a float-and-spar absorber connected to an above-water installation using a four-bar linkage having hinge joints, wherein the shafts of the hinge joints are connected to a PTO system via a gear system.
Figure 3:
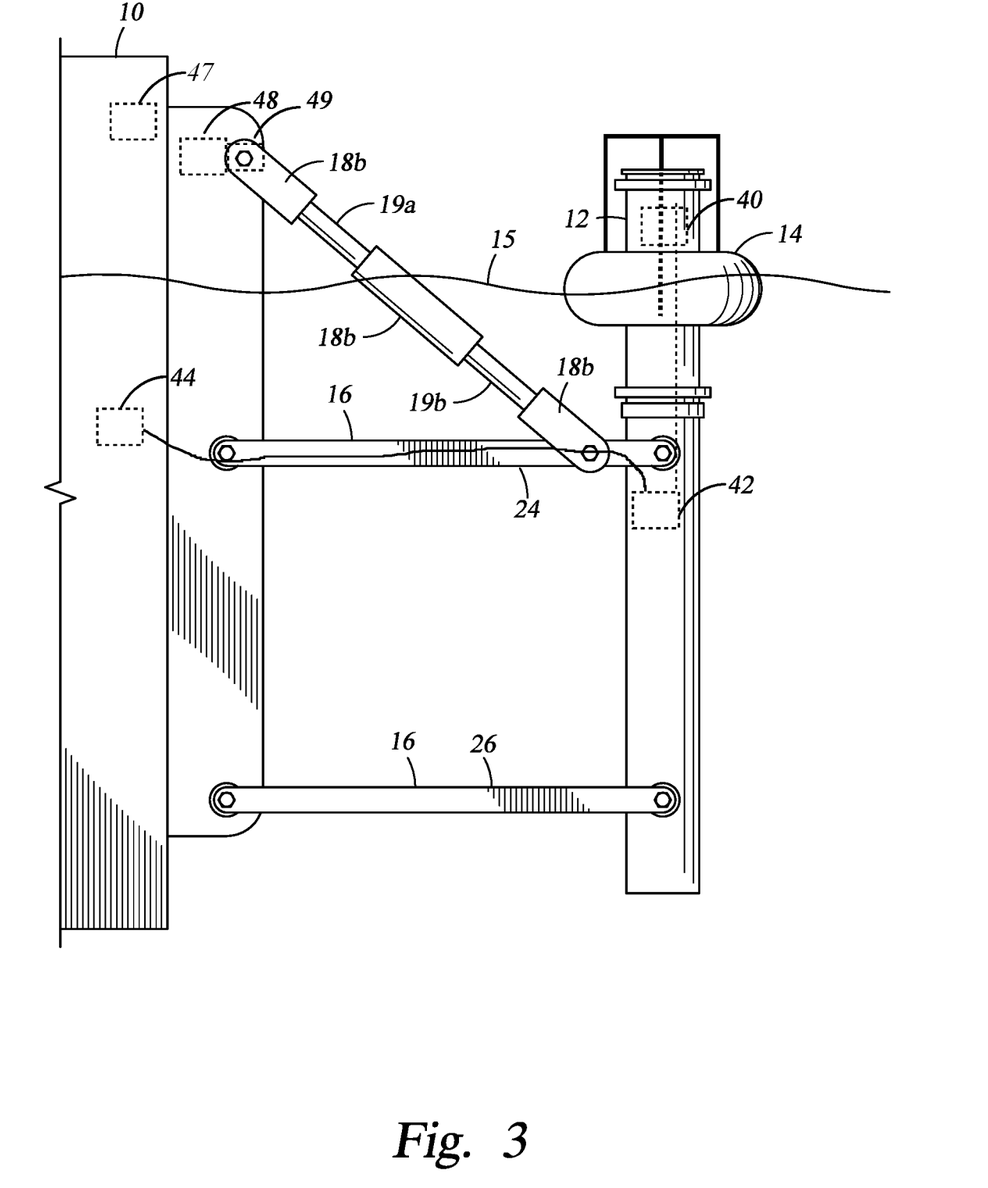
FIG. 3 is a float-and-spar absorber connected to an above-water installation using a four-bar linkage having bars, wherein the bars are connected to a PTO system.

In an alternative to simply locking one or more joints of the linkage 16, another means of restricting the movements of the spar 12 is achieved by including external PTO(s) 18a, 18b to one (or more) of the joints, crank, and rocker. The PTOs 18a, 18b are called external PTOs because they are external to the dual-point absorber formed solely by the spar 12 and the float 14. In these cases, additional electrical energy can be generated from the waves, thus increasing the efficiency of the system in harvesting the wave energy. Some embodiments of such a concept are illustrated in FIGS. 2, 2A, and 3. Preferably, the float-and-spar absorber and its internal PTO are designed for, and operated at least during, sea states wherein the waves have short periods. Furthermore, the external PTO is preferably designed for, and operated at least during, sea states wherein the waves have long periods.

Depending on the sea state, i.e., the wave height and period, either or both internal and external PTOs can be operated to generate electricity. For example, a controller 47 coupled to the internal and/or external PTO of the float-and-spar absorber may be used to monitor sea state. The controller may receive signals indicative of the movement of the spar 12, indicative of the movement of the float 14 relative to the spar 12, or both. In some embodiments, the signals indicative of the movement of the spar 12 and those indicative of the movement of the float 14 relative to the spar 12 can be combined or processed to generate signals indicative of the movement of the float 14 that can, in turn, be received by the controller 47. Alternatively, the controller 47 may receive signals from an external wave-rider buoy 45. The controller 47 may switch a portion of the electronic in the float-and-spar absorber into sleep mode when the sea state is characterized by waves that have long periods. Therefore, electric energy may be saved when the float-and-spar absorber does not generate enough of it. Furthermore, the controller may cause the blockage of the movement of the linkage 16 when the sea state is characterized by waves that have short periods. For example, in addition to being coupled to an electric generator 48, the external PTOs 18a, 18b may be coupled to a brake 49. Therefore, fast movements that would otherwise generate excessive loads in the external PTO and damage it are not transmitted to the external PTO, and the external PTO is not operated. There may be sea states that fall between a sea state characterized by waves that have short periods and a sea state characterized by waves that have long periods. In such a sea state, the electronic in the float-and-spar absorber may not be switched into sleep mode, and the controller may cause only a slowing of the movement of the linkage 16.

In FIG. 2, the external PTOs 18a are coupled to the shafts of the hinge joints of the crank and rocker of the linkage 16. Fewer than two PTOs 18a may be implemented. In alternative embodiments of the linkage 16, more than two PTOs 18a may be implemented.

In FIG. 2A, the external PTOs 18a can each include a gearbox or a system of hydraulic pump and motor that are connected to shafts extending from the crank and/or rocker that forms a hinge joint. The gearbox or the system of hydraulic pump and motor allows the conversion of the slow rotation of the shaft extending from the crank and/or rocker into a fast rotation that is then communicated to the generator.

Figure 5A:
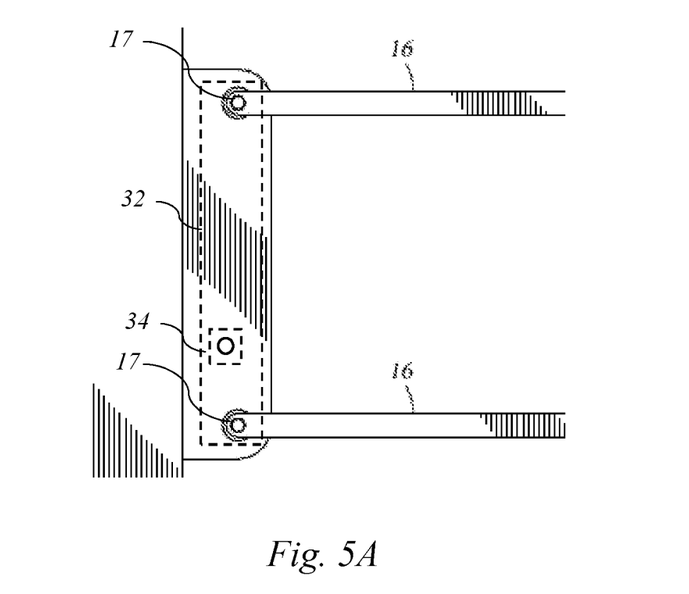
FIG. 5A is a transmission of a linkage to a differential gear coupled to a generator.

In alternative cases, for example illustrated in FIG. 5A, the rotation of the crank of the linkage 16 and the rotation of the rocker of the linkage 16 may be transmitted to a differential gear 32 having an output shaft coupled to a single generator 34. Accordingly, the torque applied by the output shaft to the generator is a combination of the torque applied by the crank to the differential gear and the torque applied by the rocker to the differential gear. Similarly, the flow generated by two hydraulic pumps 36 can be combined to drive a single hydraulic motor 38 coupled to a generator 39, for example illustrated in FIG. 5B.

Figure 5B:
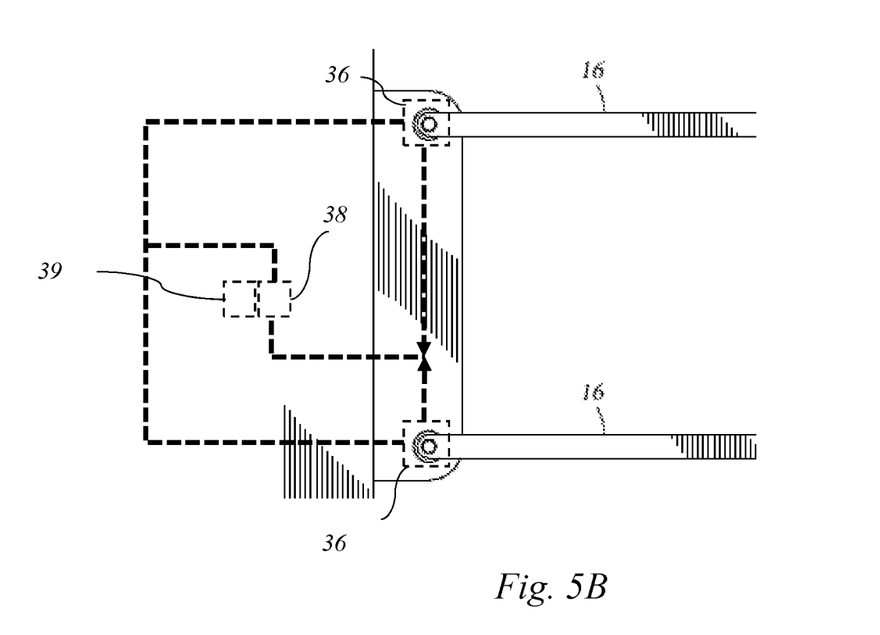
FIG. 5B is a hydraulic motor coupled to a generator, the hydraulic motor being driven by the combined flow generated by two hydraulic pumps.

The hydraulic motor can include a vane motor, a gear motor, a geromotor, an axial plunger motor, a radial piston motor, or another type of hydraulic motor. For example, the hydraulic motor can include a hydraulic jack that drives the screw of a ball screw system. The nut of the ball screw system may, in turn, be coupled to the generator.

In FIG. 3, the external PTO 18b may comprise components that may be at one or more of the three locations shown. Two bar portions 19a and 19b may or may not be an extension of each other, depending on whether any component of the external PTO 18b is located in the middle position. Furthermore, the bar portions 19a and 19b may or may not rotate, translate, or both with respect to the components of the external PTO 18b.

In some embodiments, the external PTO 18b can include a system of hydraulic piston and motor that is connected to any of the bars of the linkage 16. The system of hydraulic piston and motor allows the conversion of the slow rotation of the shaft extending from the crank and/or rocker into a fast rotation that is then again communicated to the generator. For example, a hydraulic piston may have a first end pinned to the crank of the linkage 16, and a second end pinned to the above-water installation 10, wherein a variation of the distance between the first end and the second end generates flow. Alternatively, in other embodiments, the external PTO 18b can include a ball screw that is connected to any of the bars of the linkage 16. The ball screw allows the conversion of the slow rotation of the shaft extending from the crank and/or rocker into a fast rotation that is then again communicated to the generator. The nut of a ball screw may be directly pinned to a point on the crank of the linkage 16 or may be mounted on a rod that is pinned to the crank of the linkage 16, and the screw may be pinned to the above-water installation 10 so that the screw turns when the spar 12 moves in the waves.

Alternatively, the external PTO 18a and/or 18b may be formed by the shaft of a linear electric generator, or an extension of the shaft. The shaft or shaft extension may be hinged to the crank and/or the rocker of the linkage 16. The stator of the electric linear generator may be hinged to the above-water installation 10, so that the waves generate a relative translational motion between the shaft of the generator and its stator. Conversely, the stator of the electric linear generator may be hinged to the crank and/or the rocker of the linkage 16, and the shaft or shaft extension may be hinged to the above-water installation 10.

The above-water installation 10 can be, for example, a fixed structure, grounded to the Earth (i.e., fixed to the seafloor). Alternatively, the above-water installation 10 can be, for example, a large floating object, such as a platform, because a large floating object behaves like a fixed structure under a large span of wave periods. However, a large floating object, unlike a fixed structure, can heave along with tides and storm surges. This difference can be used to advantage to simplify the design of external PTO(s) 18a, 18b for use with a large floating object connected to a float-and-spar absorber because the external PTO(s) 18a, 18b would not need to allow for as large a range of motion.

The crank and the rocker have so far been shown as straight bars in FIGS. 1, 2, and 3, which is not necessary. They can be formed as needed for strength and/or other design requirements, and they may even look different from each other whether the four-bar linkage is a parallelogram or not.

In some embodiments, an energy storage system 44 is mounted to the above-water installation 10. An umbilical cable 46 is connected to the internal PTO and to the energy storage system. Thus, no energy storage system may be required inside the float-and-spar absorber, thereby making the float-and-spar absorber smaller. The umbilical cable is preferably not coupled to a seabed anchor.

Figure 4:
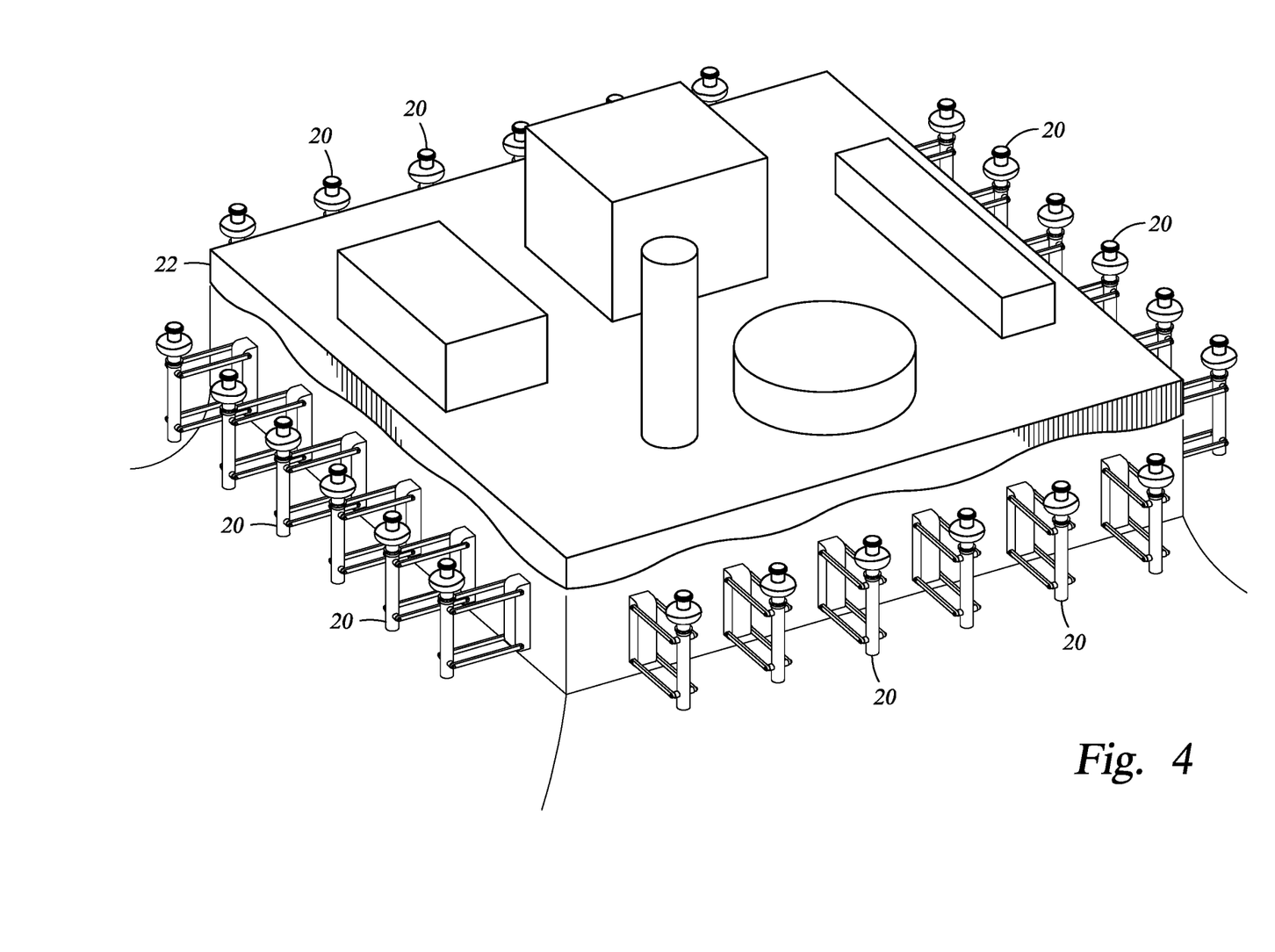
FIG. 4 is an array of dual-point absorbers connected to a platform.

It is possible to connect an array of linkages and corresponding float-and-spar absorbers 20 to a platform 22 (e.g., a moored platform), such as that shown in FIG. 4. For example, the float-and-spar absorbers 20 can be positioned all around the platform 22, thereby multiplying the electric power generation capacity of a single float-and-spar absorber.

The invention is susceptible to various modifications and alternative forms, and specific embodiments thereof are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. A wave energy converter, comprising:
   a dual-point absorber, wherein the dual-point absorber includes a first buoy, a second buoy, and a first power take-off, the second buoy being capable of a movement relative to the first buoy, the first power take-off being coupled to the first buoy and to the second buoy and configured to transmit the movement to an electric generator;
   a linkage connected to the first buoy of the dual-point absorber, wherein the linkage is capable of being further connected to an above-water installation, wherein the linkage is capable of moving relative to the above-water installation; and
   a second power take-off, the second power take-off being coupled to the linkage;
   wherein the linkage and the second power take-off are configured to reduce, in use, a heave movement of the first buoy that is caused by waves.

2. The wave energy converter of claim 1, wherein the first buoy has a lower hydrostatic stiffness with respect to heave than the second buoy and the first buoy is heavier than the second buoy.

3. The wave energy converter of claim 1, wherein no energy storage is mounted in the dual-point absorber, and the wave energy converter further comprising:
   an energy storage system capable of being mounted to the above-water installation;
   an umbilical cable configured to be connected to the generator and to the energy storage system, wherein the umbilical cable is not coupled to a seabed anchor.

4. The wave energy converter of claim 1, the wave energy converter further comprising:
   a controller coupled to the second power take-off, wherein the controller is programmed to monitor a sea state and to cause a slowing-down or a blockage of movement of the linkage based on the monitored sea state.

5. The wave energy converter of claim 4, further comprising a third buoy, wherein the controller receives signals indicative of movement of the third buoy used to monitor the sea state.

6. The wave energy converter of claim 4, wherein the controller receives signals indicative of movement of the first buoy, movement of the second buoy relative to the first buoy, or movement of the second buoy.

7. The wave energy converter of claim 4, wherein the linkage includes a first bar hinged on the first buoy and a second bar hinged on the first buoy, and wherein the second power take-off is coupled to the first bar, the wave energy converter comprising a third power take-off, the third power take-off being coupled to the second bar and the third power take-off being distinct from the second power take-off.

8. The wave energy converter of claim 4, wherein the controller is programmed to actuate a brake to cause the slowing-down or the blockage of movement of the linkage.

9. The wave energy converter of claim 1, further comprising:
   a first shaft being coupled to a first bar of the linkage at a first connection point of the linkage;
   a second shaft being coupled to a second bar of the linkage at a second connection point of the linkage; and
   a differential gear having a first input shaft coupled to the first bar via the first shaft, a second input shaft coupled to the second bar via the second shaft, and an output shaft coupled to another electric generator.

10. The wave energy converter of claim 1, further comprising:
    two hydraulic pumps, each of the two hydraulic pumps being coupled to the linkage; and
    a single hydraulic motor coupled to another electric generator, wherein respective flows generated by the two hydraulic pumps are combined to drive the single hydraulic motor.

11. A method of converting wave energy into electric energy, comprising:
    providing a dual-point absorber, wherein the dual-point absorber includes a first buoy, a second buoy, and a first power take-off, the second buoy being capable of a movement relative to the first buoy, the first power take-off being coupled to the first buoy and to the second buoy and configured to transmit the movement to a generator, wherein the first buoy of the dual-point absorber is connected to a linkage, wherein the linkage is capable of moving relative to an above-water installation;
    providing a second power take-off, the second power take-off being coupled to the linkage;
    connecting the linkage to the above-water installation;
    reducing a heave movement of the first buoy that is caused by waves via the linkage using the second power take-off; and
    producing electric energy via the generator.

12. The method of claim 11, wherein the first buoy has a lower hydrostatic stiffness with respect to heave and is heavier than the second buoy.

13. The method of claim 11, further comprising:
    providing an energy storage system on the above-water installation; and
    connecting an umbilical cable to the generator and to the energy storage system, wherein the umbilical cable is not coupled to a seabed anchor.

14. The method of claim 11, further comprising:
    providing a controller, the controller being coupled to the second power take-off;
    using the controller to monitor a sea state; and
    using the controller to cause a slowing-down or a blockage of movement of the linkage based on the monitored sea state.

15. The method of claim 14, wherein the controller is programmed to actuate a brake to cause the slowing-down or the blockage of movement of the linkage.

16. The method of claim 11, further comprising:
    providing two power take-offs, the two power take-offs being coupled to the linkage and to an other generator;
    coupling the two power take-offs to the other generator such that each of the two power take-offs applies a torque to the other generator; and
    producing electric energy via the other generator.

17. The method of claim 11, wherein the linkage includes a first bar hinged on the first buoy and a second bar hinged on the first buoy, and wherein the second power take-off is coupled to the first bar, method comprising:
 providing a third power take-off, the third power take-off being coupled to the second bar and the third power take-off being distinct from the second power take-off.

\* \* \* \* \*